United States Patent [19]

Schegk

[11] Patent Number: 5,461,860
[45] Date of Patent: Oct. 31, 1995

[54] EXHAUST GAS TURBOCHARGER AND METHOD OF OPERATION

[75] Inventor: Claus-Detlef Schegk, Klingnau, Switzerland

[73] Assignee: ABB Management AG, Baden, Switzerland

[21] Appl. No.: 319,565

[22] Filed: Oct. 7, 1994

[30] Foreign Application Priority Data

Oct. 9, 1993 [DE] Germany .......................... 43 34 466.6

[51] Int. Cl.[6] .................................................. F02B 37/00
[52] U.S. Cl. .................................................. 60/611
[58] Field of Search ...................... 60/611, 612

[56] References Cited

U.S. PATENT DOCUMENTS

| | | | |
|---|---|---|---|
| 3,190,068 | 6/1965 | Williams et al. | 60/611 |
| 3,370,417 | 2/1968 | Koziara | 60/611 |
| 3,396,534 | 8/1968 | Bernson et al. | 60/611 |
| 3,462,071 | 8/1969 | Garve | 60/611 |
| 4,689,960 | 9/1987 | Schroder et al. | 60/611 |
| 4,696,165 | 9/1987 | Bucher | 60/611 |
| 5,218,822 | 6/1993 | Legg | 60/611 |

FOREIGN PATENT DOCUMENTS

| | | | |
|---|---|---|---|
| 1626542 | 1/1971 | Germany . | |
| 3504465 | 1/1986 | Germany . | |
| 59-101539 | 6/1984 | Japan | 60/611 |

*Primary Examiner*—Michael Koczo
*Attorney, Agent, or Firm*—Oblon, Spivak, McClelland, Maier & Neustadt

[57] ABSTRACT

An exhaust gas turbocharger for an internal combustion engine consists essentially of a turbine and a centrifugal compressor, which are both arranged on a common shaft. A vaned diffuser adjoins the compressor impeller driven by the turbine. An auxiliary air drive, which is fed from an external compressed air source, is provided in the compressor part. The auxiliary air drive has a plurality of ejectors by means of which the auxiliary air can be introduced into the region of the diffuser inlet, preferably in the flow direction.

6 Claims, 1 Drawing Sheet

5,461,860

EXHAUST GAS TURBOCHARGER AND METHOD OF OPERATION

BACKGROUND OF THE INVENTION

1. Field of the Invention

The invention relates to an exhaust gas turbocharger for an internal combustion engine, consisting essentially of a turbine and a centrifugal compressor, which are both arranged on a common shaft, whereby a vaned diffuser adjoins the compressor impeller driven by the turbine and whereby an auxiliary air drive, which is fed from an external compressed air source, is provided in the compressor part.

2. Discussion of Background

The acceleration behavior of the turbocharger when the internal combustion engine, for example a diesel engine, comes on load has to be improved by means of the auxiliary air drive in such exhaust gas turbochargers. The auxiliary air is then, as a rule, introduced into the compressor impeller. For this purpose, driving jets emerging from a plurality of nozzles are directed onto the impeller vanes. This can excite the vanes to vibrate. The danger of surging in the compressor impeller, latently existing due to the auxiliary air introduced, limits the air quantity delivered to the internal combustion engine and this acts against the desired acceleration effect. Flat inlet angles are therefore provided, particularly for reasons of vibration. Flat inlet angles, however, generate little drive. With increasing rotational speed, the inlet angle, and therefore the driving force, becomes smaller and smaller. In addition, the auxiliary air quantity must be limited for excitation reasons.

An exhaust gas turbocharger of the type mentioned at the beginning is, for example, known from DE-C1-35 04 465. A plurality of nozzle passages branch off from a compressed air collecting space arranged in the compressor casing. Compressed air is specifically directed onto the compressor impeller via these nozzle passages when required. Blading additional to the normal blading is provided, for this purpose, on the compressor impeller. This blading consists of auxiliary drive vanes evenly distributed around the periphery. The axes of the nozzle passages are directed onto the auxiliary driving vanes at an angle optimizing the ejector effect.

SUMMARY OF THE INVENTION

Accordingly, the invention attempts to avoid the disadvantages mentioned above and one object of this invention is, by simple means, markedly to improve the acceleration behavior of an exhaust gas turbocharger of the type mentioned at the beginning.

This is achieved in accordance with the invention wherein the auxiliary air drive has a plurality of ejectors by means of which the auxiliary air can be introduced into the region of the diffuser inlet.

The departure from the previous principle, of direct drive of the compressor impeller by the auxiliary air, has the advantage that the new measure does not disturb the flow within the compressor impeller so that the quantity and condition of the air to be introduced can be freely selected. The previous puff of smoke from the internal combustion engine can be avoided because it is now possible to supply a large quantity of air in the shortest time to the internal combustion engine when the latter is put under load. The arriving exhaust gas flow, which is immediately increased and is processed in the turbine, accelerates the turbocharger to the desired extent.

It is particularly expedient for the auxiliary air to be introduced into the diffuser inlet in the flow direction between each two adjacent diffuser vanes, preferably at the narrowest cross-section. The resulting depression at the diffuser inlet supports the flow within the compressor impeller.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
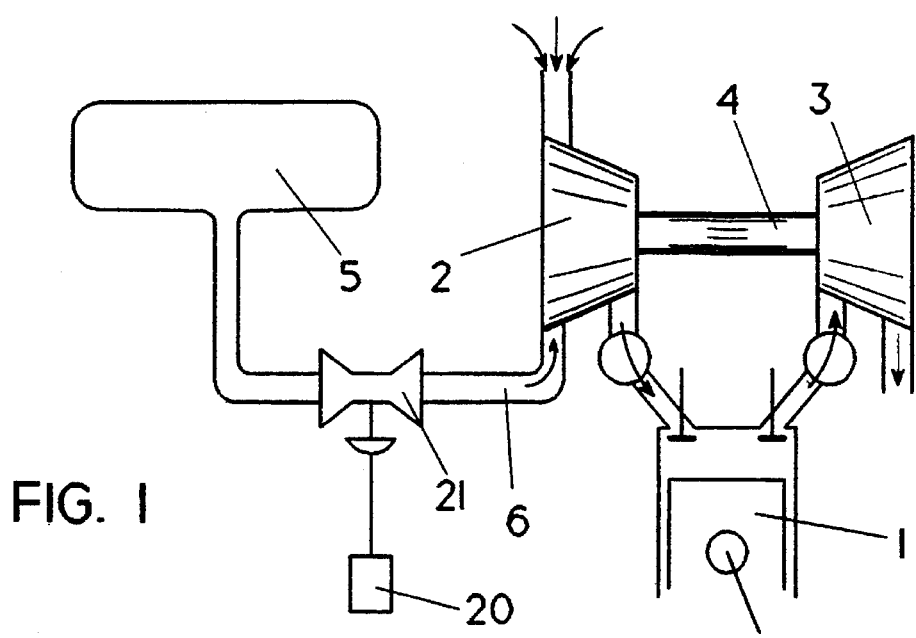
FIG. 1 shows, diagrammatically, an exhaust gas turbocharger circuit, including the compressed air supply, on a diesel engine.

Referring now to the drawings, wherein like reference numerals designate identical or corresponding parts throughout the several views, where the flow direction of the working media is indicated by arrows and where only the parts essential to the invention are shown, the system sketched in FIG. 1 consists essentially of an internal combustion engine 1, a diesel engine in the present case, which is supplied with compressed air by means of the compressor 2 of an exhaust gas turbocharger. The compressor drive is provided by the supercharger turbine 3, to which is admitted the exhaust gases of the diesel engine and which, together with the compressor impeller, is arranged on a common shaft 4.

Figure 2:
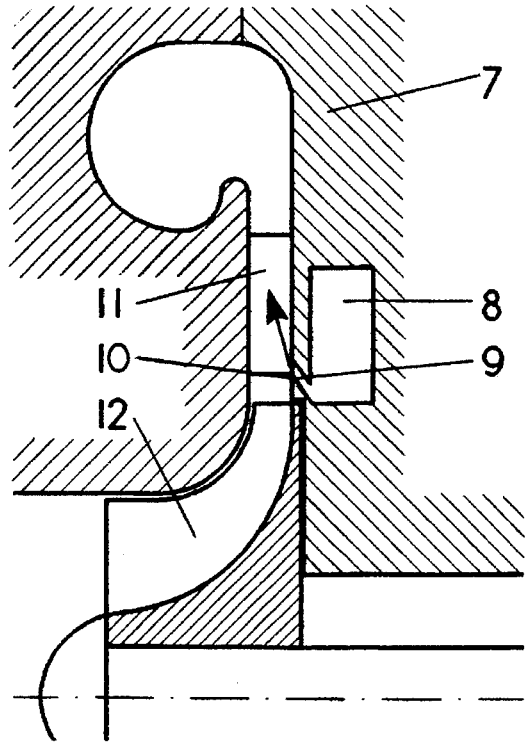
FIG. 2 shows a partial cross-section through the compressor part of the exhaust gas turbocharger.
Figure 3:
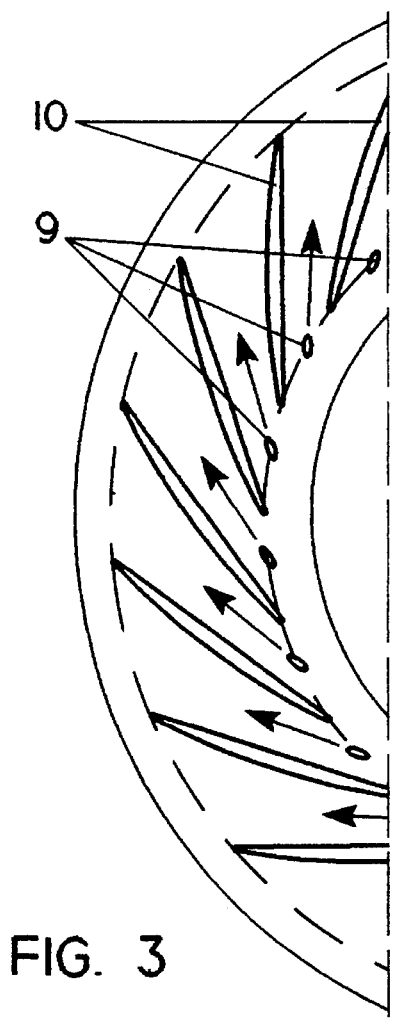
FIG. 3 shows a partial front view of the compressor part.

Means for feeding outside energy in the form of an auxiliary air drive, in the case of a lack of exhaust gas for starting and acceleration, are associated with the compressor 2. These means involve a compressed air source, a compressed air container 5 in the example, which can be charged from a compressor (not shown). The compressed air container supplies compressed air via a compressed air conduit 6 into a ring manifold 8 arranged in the compressor casing 7 (FIG. 2).

In accordance with the invention, this auxiliary air drive has a plurality of ejectors 9 which are fed from the ring manifold 8. The openings of the ejectors 9, which penetrate the compressor casing 7, are located downstream of the compressor impeller vanes 12. They emerge in the radial plane of the diffuser inlet 11 and, specifically, in the center of the narrowest cross-section between two adjacent diffuser vanes 10. One ejector 9 is associated with each diffuser duct. The openings of the ejectors are oriented in the direction of the diffuser vanes. An attempt is made to achieve an outlet flow at the flattest possible angle to the duct wall bounding the flow and in the direction of the bisector of the duct.

The ejectors 9 are dimensioned in such a way that they are capable of introducing into the diffuser a multiple of the previous auxiliary air quantity mentioned at the beginning. Because the air quantity demanded instantaneously differs depending on the operating condition of the diesel engine, a quantity control is provided and, for this purpose, a control device 20 and a control valve 21 are—in the simplest case—integrated into the system. Either engine parameters or supercharger parameters, such as rotational speeds or pressure ratios, can be used as the control parameters.

The mode of operation of the new measure is as follows. In operating conditions in which too little exhaust gas is supplied to the supercharger turbine 3 by the diesel engine, for example when the internal combustion engine has to be rapidly accelerated from idle and, for this purpose, the exhaust gas turbocharger has to be brought to a rotational speed higher than the existing one, an instruction is given to the control device 20 to open the control valve 21. The auxiliary air flows from the compressed air container 5 via the pressure conduit 6 and the ring manifold 8 through the individual ejectors 9. The auxiliary air expanding in the diffuser ducts, which is introduced in a quantity between two and four times the previously usual air quantity, is immediately available to the internal combustion engine without impairing the flow between the impeller vanes 12 of the compressor impeller. On the contrary, the auxiliary air emerging in the form of driving jets, additionally exerts a slight suction effect on the flow in the impeller so that the acceleration capability of the latter is further improved. With increasing acceleration of the compressor impeller, the auxiliary air quantity can now be increasingly throttled by means of the control device. When the rated rotational speed is reached, the supply of auxiliary air is shut off. Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An exhaust gas turbocharger for an internal combustion engine, comprising:

a turbine and a centrifugal compressor, which are both arranged on a common shaft, said compressor for compressing air to be delivered to the internal combustion engine, said compressor including an impeller driven by the turbine and a vaned diffuser having an inlet positioned downstream from said impeller in a flow direction of the air compressed by said impeller; and an auxiliary air drive comprising a plurality of injectors fed from an external compressed air source, said air injectors having delivery openings disposed in the region of said diffuser inlet and downstream of said impeller.

2. The exhaust gas turbocharger of claim 1 wherein said delivery openings are directed toward the vanes of said diffuser.

3. The exhaust gas turbocharger of claim 2 wherein said delivery openings are disposed in the radial plane of said diffuser inlet and are located between two adjacent diffuser vanes.

4. The exhaust gas turbocharger of claim 1 wherein said compressor has a casing, including a common ring manifold arranged in the compressor casing and supplying said injectors with compressed air.

5. The exhaust gas turbocharger of claim 1 wherein said auxiliary air drive includes a control valve for controlling a flow of compressed air to said injectors.

6. A method for operating an exhaust gas turbocharger for an internal combustion engine, the exhaust gas turbocharger comprising a turbine and a centrifugal compressor, which are both arranged on a common shaft, said compressor for compressing air to be delivered to the internal combustion engine, said compressor including an impeller driven by the turbine and a vaned diffuser having an inlet positioned downstream from said impeller in a flow direction of the air compressed by said impeller, and an auxiliary air drive comprising a plurality of injectors fed from an external compressed air source, said air injectors having delivery openings disposed in the region of said diffuser inlet and downstream of said impeller, comprising the steps of:

controlling the supply of auxiliary air such that a maximum quantity of auxiliary air is admitted to said diffuser inlet when the engine is idling;

increasingly throttling the auxiliary air admitted to said diffuser inlet with increasing acceleration of the compressor impeller; and shutting off the flow of auxiliary air to said diffuser inlet when a rated rotational speed is reached by the compressor impeller.

\* \* \* \* \*